(12) United States Patent
Goggin et al.

(10) Patent No.: US 12,106,771 B2
(45) Date of Patent: Oct. 1, 2024

(54) LASER FEEDBACK SUPPRESSOR FOR HEAT-ASSISTED MAGNETIC RECORDING

(71) Applicant: Seagate Technology LLC, Fremont, CA (US)

(72) Inventors: Aidan Dominic Goggin, Donegal (IE); John Moloney, Castleconnell (IE); Reyad Mehfuz, Londonderry (GB); Chuan Zhong, Londonderry (GB); Christopher Neil Harvey, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/371,146

(22) Filed: Sep. 21, 2023

(65) Prior Publication Data

US 2024/0013806 A1 Jan. 11, 2024

Related U.S. Application Data

(63) Continuation of application No. 17/546,855, filed on Dec. 9, 2021, now Pat. No. 11,817,119, which is a continuation of application No. 17/082,360, filed on Oct. 28, 2020, now Pat. No. 11,227,633.

(60) Provisional application No. 62/928,442, filed on Oct. 31, 2019.

(51) Int. Cl.
| | | |
|---|---|---|
| *G11B 5/48* | (2006.01) | |
| *G11B 13/08* | (2006.01) | |
| G11B 5/00 | (2006.01) | |
| G11B 5/60 | (2006.01) | |
| G11B 11/105 | (2006.01) | |

(52) U.S. Cl.
CPC ............ *G11B 13/08* (2013.01); *G11B 5/4866* (2013.01); *G11B 2005/0021* (2013.01); *G11B 5/6088* (2013.01); *G11B 11/105* (2013.01)

(58) Field of Classification Search
CPC ..... G11B 5/4866; G11B 5/314; G11B 5/6088; G11B 2005/0021; G11B 13/08; G11B 11/105; G11B 5/00
USPC .......................................................... 360/59
See application file for complete search history.

(56) References Cited

U.S. PATENT DOCUMENTS

| | | |
|---|---|---|
| 5,337,328 A | 8/1994 | Lang et al. |
| 6,314,117 B1 | 11/2001 | Heim et al. |
| 7,042,810 B2 | 5/2006 | Akiyama et al. |
| 8,213,271 B2 | 7/2012 | Boone, Jr. et al. |
| 8,228,634 B2 | 7/2012 | Jin et al. |
| 8,243,561 B2 | 8/2012 | Matsumoto |
| 8,456,969 B1 | 6/2013 | Mooney et al. |
| 8,477,571 B1 | 7/2013 | Zhou et al. |
| 8,923,098 B2 | 12/2014 | Jin et al. |
| 9,484,051 B1 | 11/2016 | Krichevsky et al. |
| 10,614,843 B2 | 4/2020 | Harvey et al. |

(Continued)

*Primary Examiner* — Nabil Z Hindi
(74) *Attorney, Agent, or Firm* — Mueting Raasch Group

(57) ABSTRACT

A recording head includes a channel waveguide that delivers light to a media-facing surface. A near-field transducer (NFT) is at an end of the channel waveguide and proximate to the media-facing surface. A laser including an active region has a longitudinal axis corresponding to a propagation direction of the channel waveguide. The active region includes a back facet and a front facet proximate the NFT. The front facet has a surface shape configured to suppress back reflection of the light.

20 Claims, 11 Drawing Sheets

(56) References Cited

U.S. PATENT DOCUMENTS

2013/0279310 A1 10/2013 Zhong et al.
2015/0364899 A1* 12/2015 Tatah .................. G11B 5/6088
372/20

* cited by examiner

LASER FEEDBACK SUPPRESSOR FOR HEAT-ASSISTED MAGNETIC RECORDING

RELATED PATENT DOCUMENTS

This application is a continuation of U.S. application Ser. No. 17/546,855 filed on Dec. 9, 2021, which is a continuation of U.S. application Ser. No. 17/082,360 filed on Oct. 28, 2020 now U.S. Pat. No. 11,227,633, and which claims the benefit of U.S. Provisional Application No. 62/928,442, filed on Oct. 31, 2019, which are incorporated herein by reference in their entireties.

SUMMARY

Embodiments described herein involve a recording head comprising a channel waveguide that delivers light to a media-facing surface. A near-field transducer (NFT) is at an end of the channel waveguide and proximate to the media-facing surface. A laser comprising an active region has a longitudinal axis corresponding to a propagation direction of the channel waveguide. The active region comprises a back facet and a front facet proximate the NFT. The front facet has a surface shape configured to suppress back reflection of the light.

Embodiments involve a recording head comprising a channel waveguide that delivers light to a media-facing surface. A near-field transducer (NFT) is at an end of the channel waveguide and proximate to the media-facing surface. A laser comprises an active region having a longitudinal axis corresponding to a propagation direction of the channel waveguide. The active region comprises a back facet and an angled front facet proximate the NFT.

A method involves applying a current to an active region of an externally mounted part of a laser of a recording head, the active region emitting light from an angled front facet. The emitted light is coupled into a channel waveguide via the angled front facet. The channel waveguide extends towards a media-facing surface of the recording head. A near-field transducer is excited via the coupled light.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the NFT which achieves surface plasmon resonance. This generates surface plasmon polaritons that are directed to the recording medium which results in a hotspot in the recording layer.

Currently, a laser (e.g., laser diode) is used to provide the optical energy used to heat the HAMR recording medium. Lasers can be manufactured at very small scale (e.g., micrometer scale) yet provide the energy needed to heat the recording medium. One issue seen with conventional lasers (e.g., lasers in single package) is laser instability. A HAMR head doesn't have an optical isolator between the laser and NFT. The NFT, typically being made of a plasmonic metal such as Au, also reflects a significant amount of light, resulting in an optical feedback signal from NFT. This feedback signal fluctuates between low and high, as it interferes with signal in the laser cavity. So, as temperature varies and shifts laser wavelength, emitted power from laser also fluctuates between low and high as a consequence of feedback signal. This fluctuating laser power can occasionally make the laser unstable, causing variation in optical power delivered to the NFT. The variation in optical power leads to variations in bit-error rate (BER) and hence undercuts areal density margin.

Figure 1A:
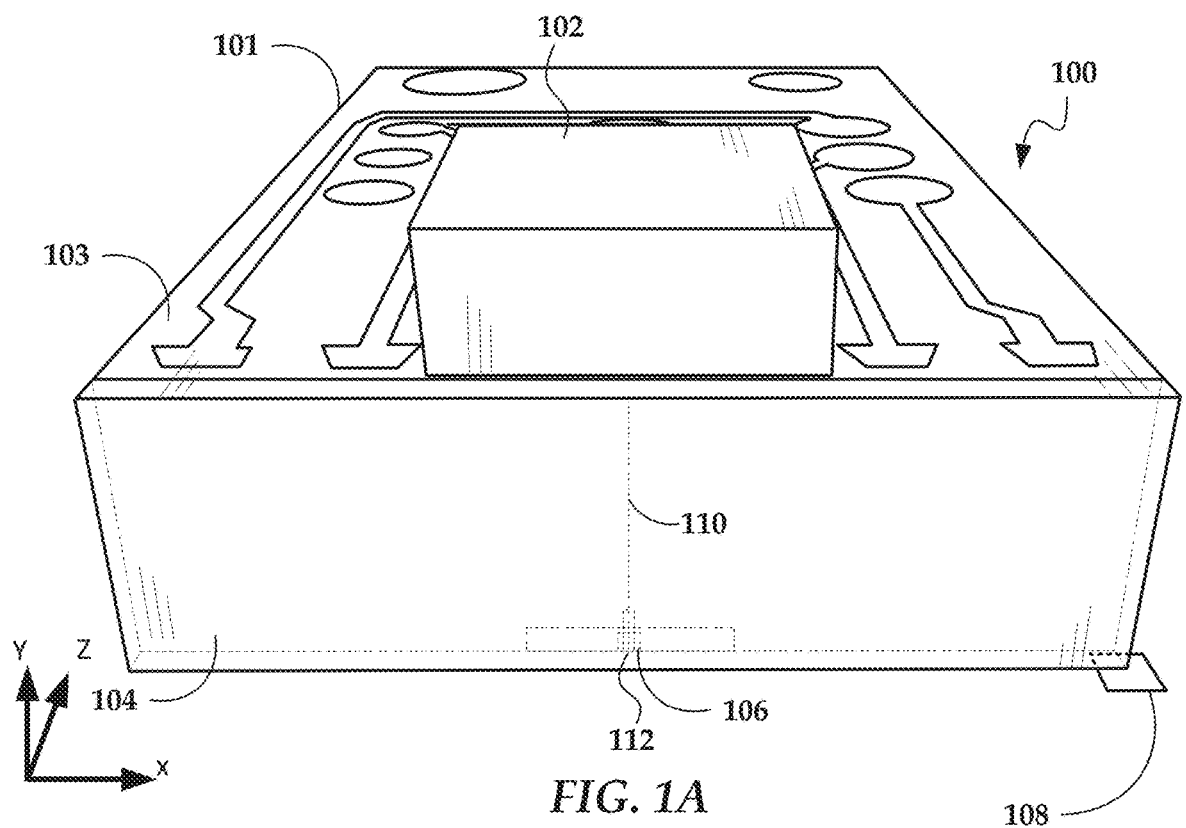
FIGS. 1A and 1B are perspective views of slider assemblies according to embodiments described herein.

In reference to FIG. 1A, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative y-direction in this view).

Figure 1B:
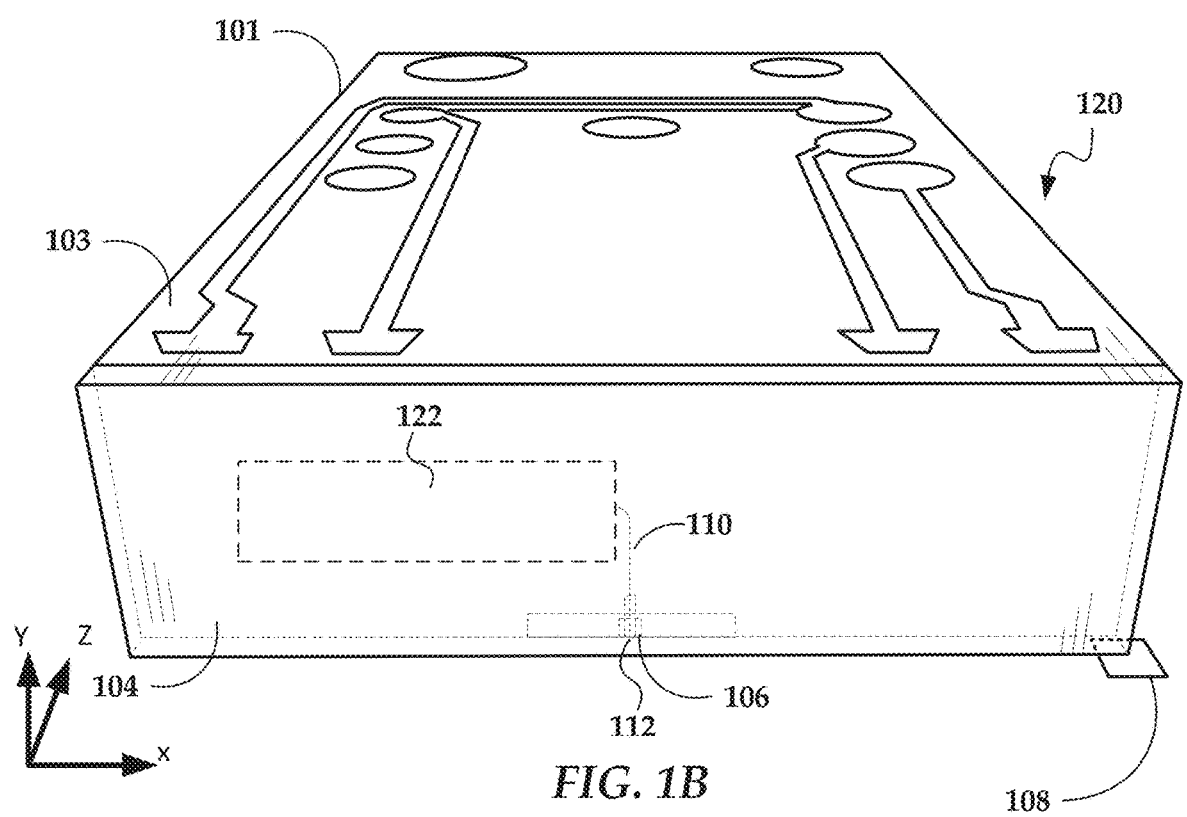

In the present disclosure, hard drive recording heads may use a different type of laser than what is shown in FIG. 1A. A read/write head 120 using this alternate approach is shown in FIG. 1B, wherein components are given the same reference numbers as analogous components in FIG. 1A. At least part of a semiconductor laser 122 or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. Carrying the semiconductor laser 122 with the read/write head substrate, without a separate or intermediate support substrate, can help to reduce the size and simplify the shape and connection methods, and it can also allow for the use of laser geometries and designs that are very different from simple edge-emitting cleaved facet lasers that have been proposed in the past.

In at least some cases, parts of the laser 122 (e.g., GaAs active region) are incompatible with epitaxial growth on the target substrate of a slider, which may be formed of a dielectric such as alumina. As such, the laser 122 cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the integrated laser diode unit 122. This process of transferring non-self-supporting layers of epitaxial-growth-incompatible layers is referred to herein as On-Wafer Laser (OWL) process integration. This process may also be referred to as transfer printing, dry transfer printing, nanoprinting, etc. Embodiments described herein may be implemented in an OWL system.

The waveguide system 110 discussed herein and shown in FIGS. 1A and 1B may be applicable to any type of light delivery configuration. For example, a laser may be mounted on the trailing edge surface 104 instead of the top surface 103. In another configuration known as free-space light delivery, a laser may be mounted external to the write head 100 and coupled to the slider by way of optic fiber and/or waveguide. An input surface of the slider body 101 may include a grating or other coupling feature to receive light from the laser via the optic fiber and/or waveguide.

Figure 2:
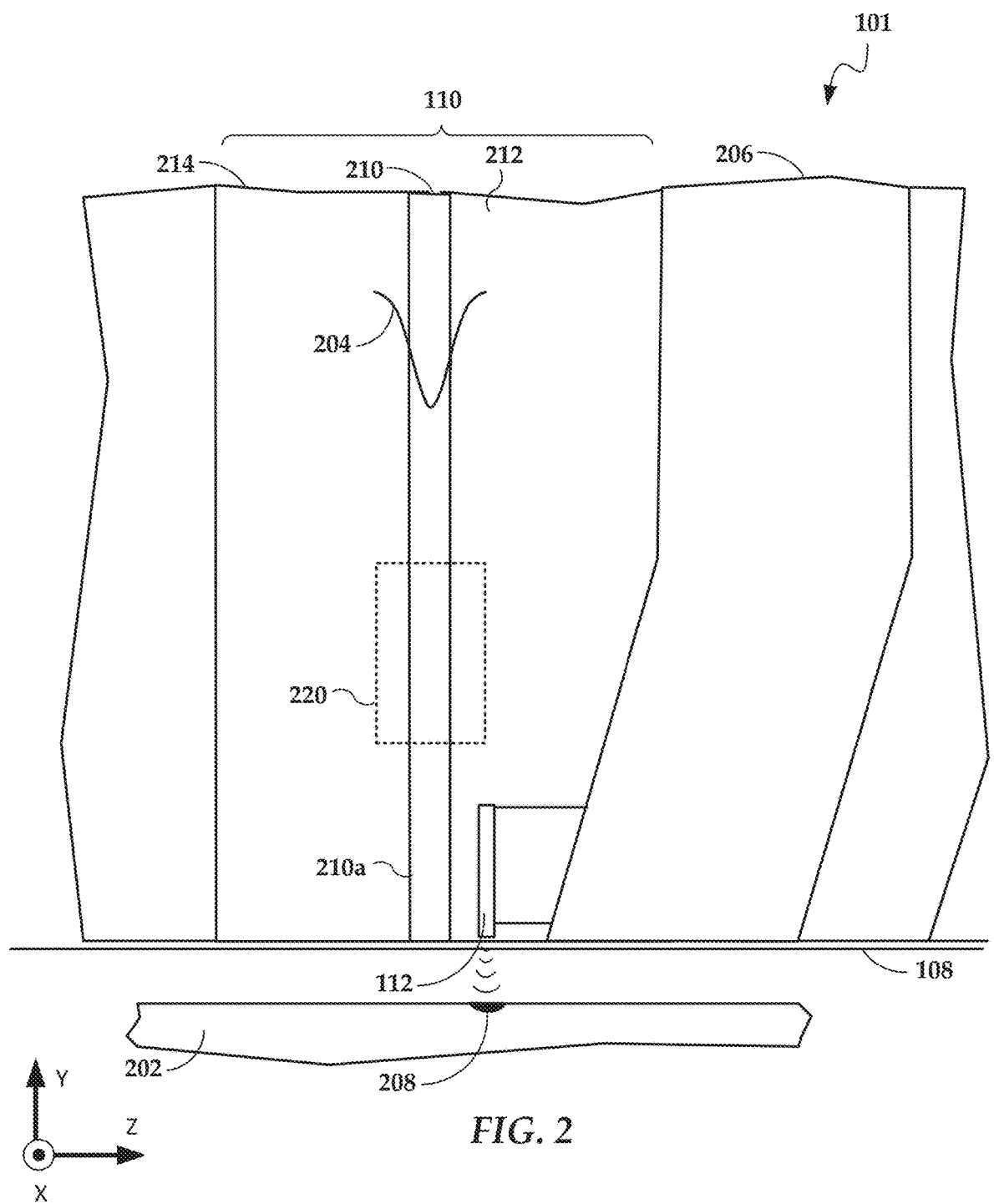
FIG. 2 is a cross-sectional view of a slider along a down-track-oriented plane according to embodiments described herein.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (z-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, $Si_3N_4$, $Nb_2O_5$, AlN, $Hf_2O_3$, $Y_2O_3$, GaP, SiC, Si, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the crosstrack direction (negative x-direction) where it is directly or indirectly coupled to a light/energy source. For example, a laser diode (e.g., OWL laser diode) may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

The laser diode used in a HAMR recording head is an open resonator, for instance, an edge-emitting laser diode. This type of device can be de-stabilized by returning light into the diode cavity, sometimes referred to as optical feedback. Optical feedback may cause laser instability and/or mode hopping, which behaves as optical output jump and dynamic intensity noise. The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode.

Mode hopping may be particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is a known factor which might cause mode hopping in laser diodes. Mode hopping is problematic for HAMR applications, as mode hopping leads to i) laser output power jumping, ii) a magnetic transition occurring earlier or later that what is expected in the down-track direction, and iii) track width decrease or increase in the cross-track direction. Embodiments are described below that can reduce or eliminate optical feedback.

Figure 3A:
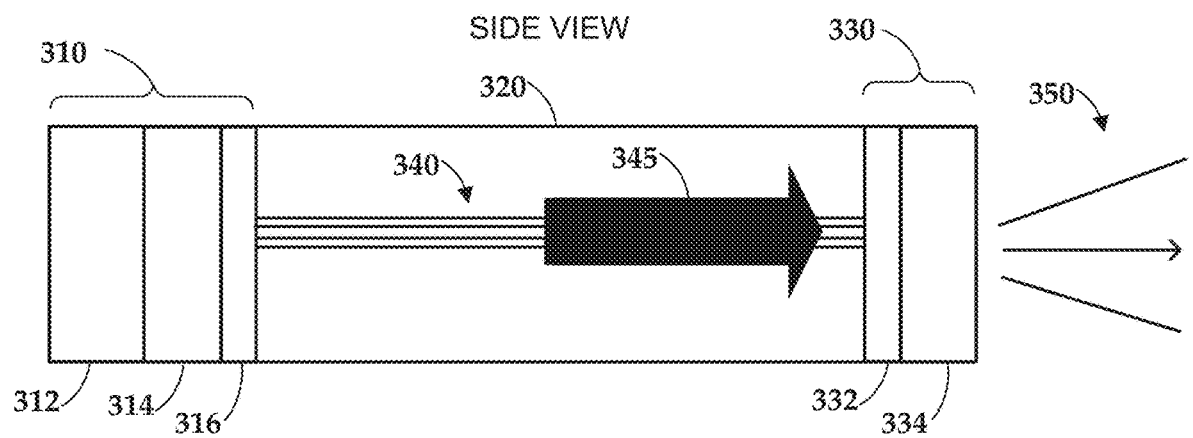
FIGS. 3A and 3B show different views of a laser in accordance with embodiments described herein.
Figure 3B:
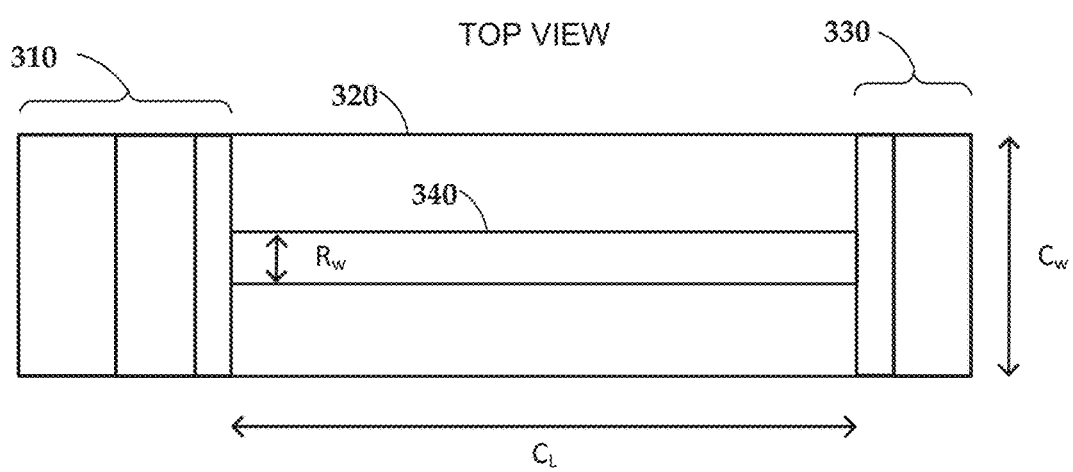

FIGS. 3A and 3B show different views of a laser in accordance with embodiments described herein. The laser 320 has aback facet 310 having layers 312, 314, 316. While the example shown here illustrates a back facet having three layers, it is to be understood that the back facet may have any number of layers.

The laser 320 has an active region 340 having one or more ridges as can be seen in the side view shown in FIG. 3A. While the examples shown herein illustrate an active region having ridges, it is to be understood that embodiments described herein may be used in embodiments without ridges. Light travels along the light propagation direction 345 towards the front facet 330 where the light exits the laser 350. The front facet has one or more layers 332, 334. While the example shown here illustrates a front facet having two layers, it is to be understood that the front facet may have any number of layers. The front facet layers 332, 334 can be made of different materials and/or may be different thicknesses. According to embodiments described herein, the front and/or the back facet comprises one or more of thin metal films, oxides, nitrides, and semiconductor passivation layers. The laser has a cavity width, $C_W$, a cavity length $C_L$, and a ridge width, $R_W$.

In embodiments described below, a facet of the laser includes one or more features that reduce back-reflected light, thereby improving in the stability of the laser during operation. The optical input coupler receives light from the light source (e.g., through a facet in a mounting surface on which the light source is attached) and directs the light towards a delivery waveguide core that couples the light to the NFT. For example, the features may include an angled, a concave, and/or a convex surface. Laser feedback suppression methods using embodiments described herein can suppress up to 25% of back reflection with only a drop of 5% of light entering the coupler, for example.

Figure 4A:
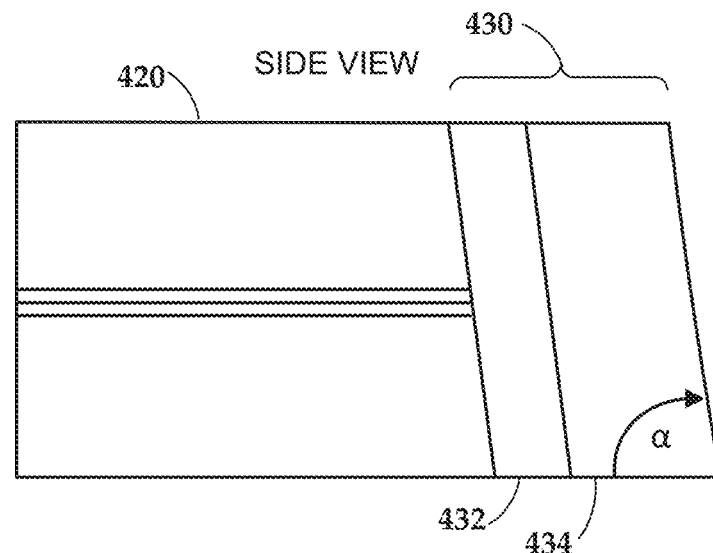
FIGS. 4A and 4B illustrate a portion of a laser having an angled front facet in accordance with embodiments described herein.
Figure 4B:
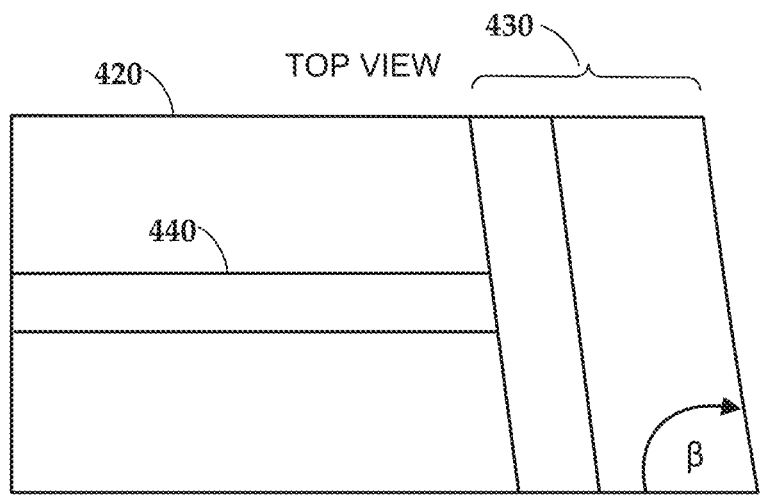

FIGS. 4A and 4B illustrate a portion of a laser 420 having an angled front facet 430 in accordance with embodiments described herein. The front facet 430 can be angled in one or more dimensions. For example, the front facet may be angled laterally (along the width of the laser) and/or vertically (along the height of the laser). FIG. 4A shows a side view of a laser and FIG. 4B shows the top view of the laser. The front facet 430 has two layers 432, 434. One or more of the layers of the front facet 430 has a vertical angle, $\alpha$ that is greater than or equal to about 45° and less than about 90°. According to various embodiments, $\alpha$ is about 85° All of the layers 432, 434 of the front facet 430 may have substantially the same angle in one or both of the lateral direction and the vertical direction. One or more of the layers of the front facet has a lateral angle, $\beta$ that is greater than or equal to about 45° and less than about 90°. According to various embodiments, $\beta$ is about 85°. While. FIGS. 4A and 4B show a laser 420 having a front facet angled in the lateral and the vertical direction, it is to be understood that the laser may have a front facet angled in only one of the vertical or lateral direction. Embodiments described herein may be applicable to any type of front facet. For example, embodiments may be applicable to cleaved facets, etched facets, coated and/or uncoated facet layers. The first facet layer may have the same or different angle with respect to a longitudinal axis along the light propagation direction.

Figure 5A:
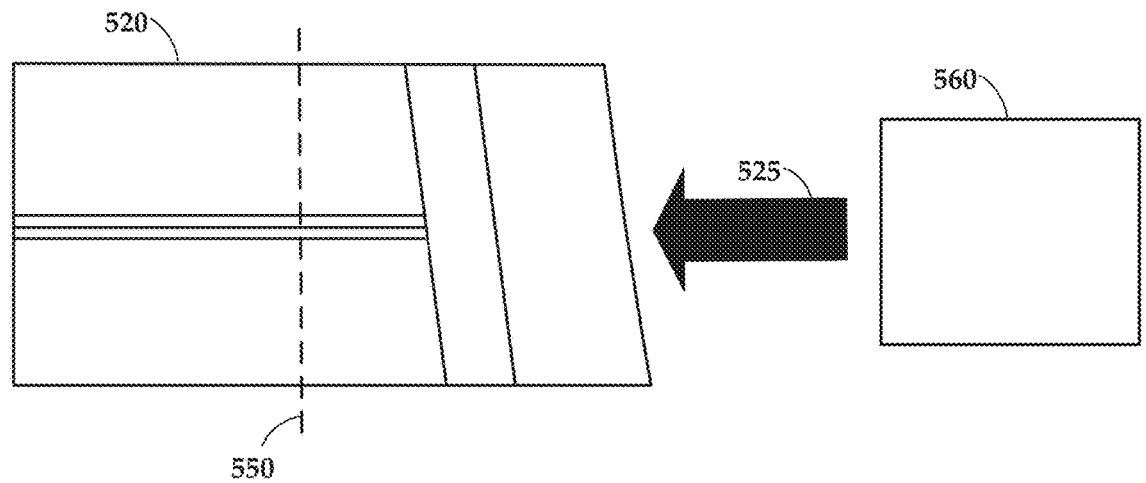
FIGS. 5A and 5B show a laser system having an angled front facet in the vertical direction with two monitors 550, 555 in accordance with embodiments described herein.
Figure 5B:
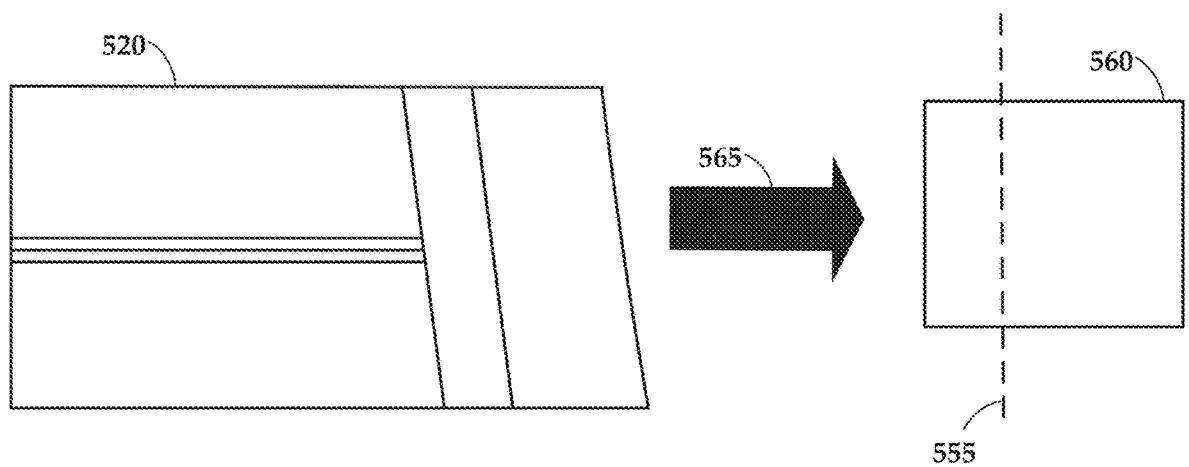

FIGS. 5A and 5B show a laser system having an angled front facet in the vertical direction with two monitors 550, 555 in accordance with embodiments described herein. A first monitor 550 located at the laser 520 is configured to track the back reflection 525 from the input coupler 560. A second monitor 555 located at the input coupler 560 is configured to track the light transmission 565 from the laser 520 to the input coupler 560. The figure of merit (FOM) used for laser suppression is represented by (1).

$$FOM = \frac{A}{B} \quad (1)$$

Here, A represents the light 525 that is reflected back into the laser cavity 520 from the input coupler 560 and B represents the light 565 that is transmitted from the laser 520 to the input coupler. This illustrates the ratio of light entering the laser cavity 520 to the light entering the coupler 560.

Figure 6A:
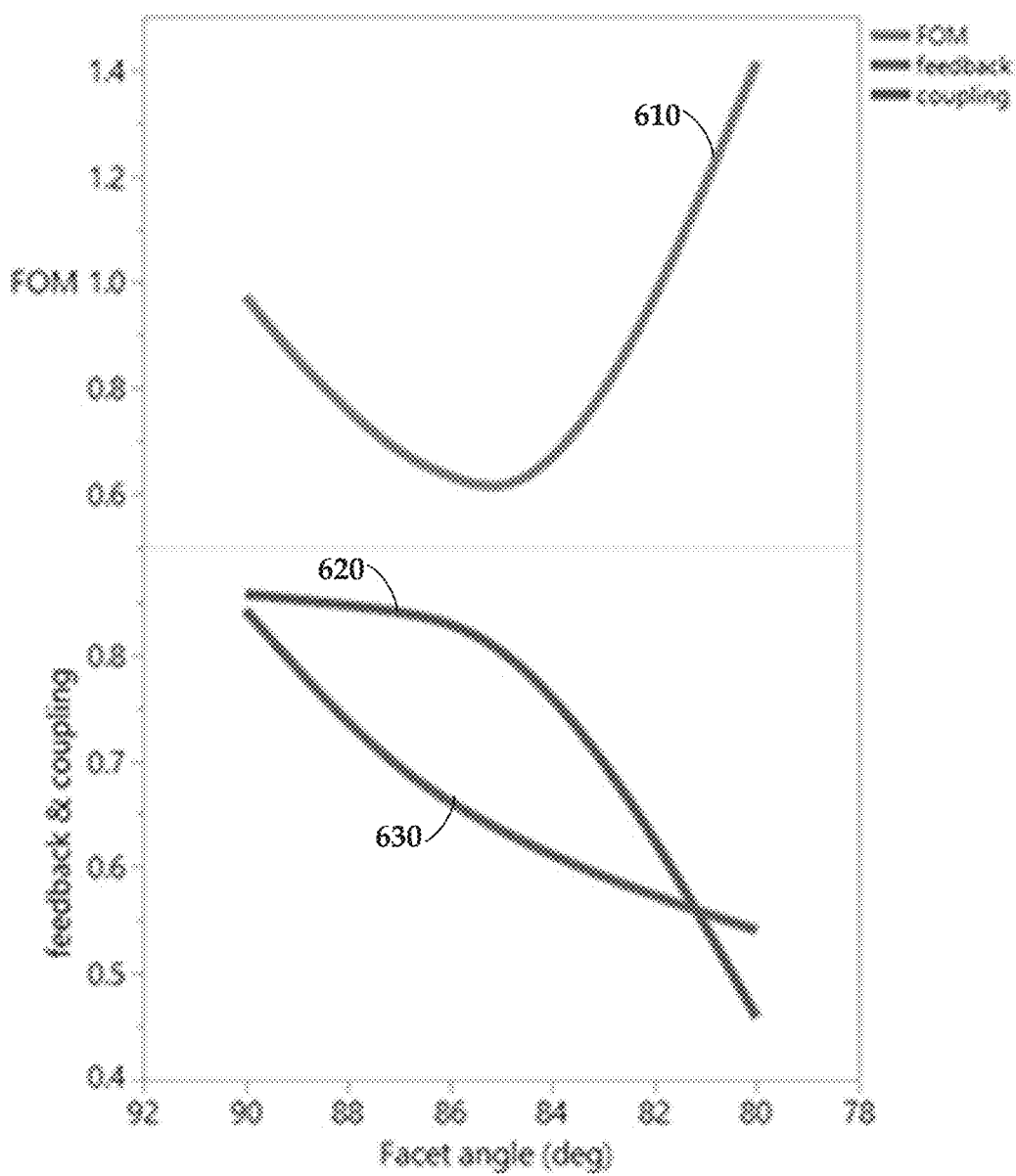
FIGS. 6A-6C show example results using an angled laser feedback suppressor with an input coupler for a laterally angled front facet in accordance with embodiments described herein.
Figure 6B:
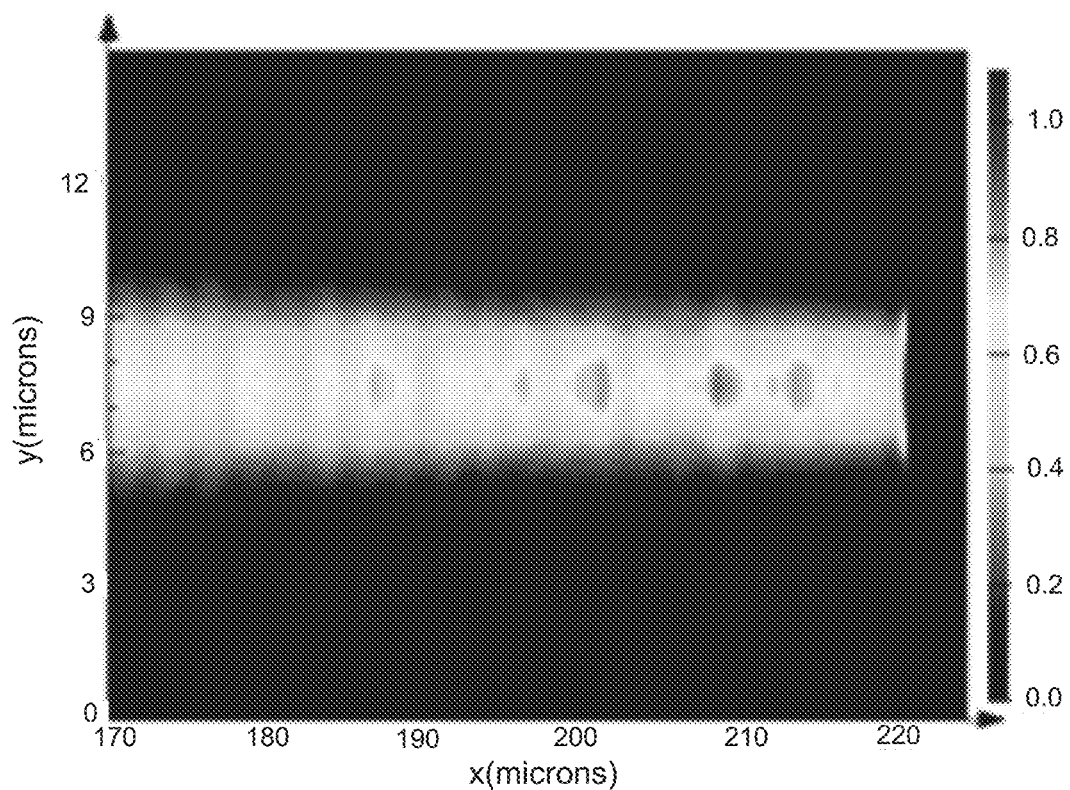
Figure 6C:
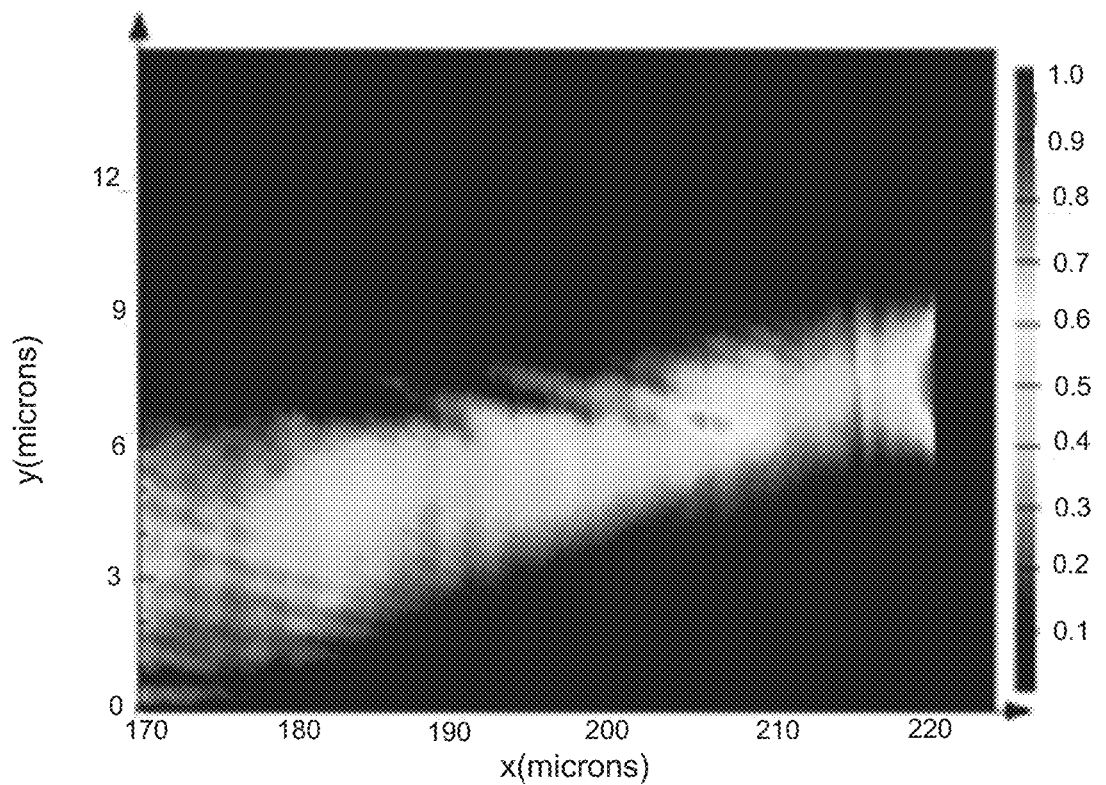
Figure 6D:
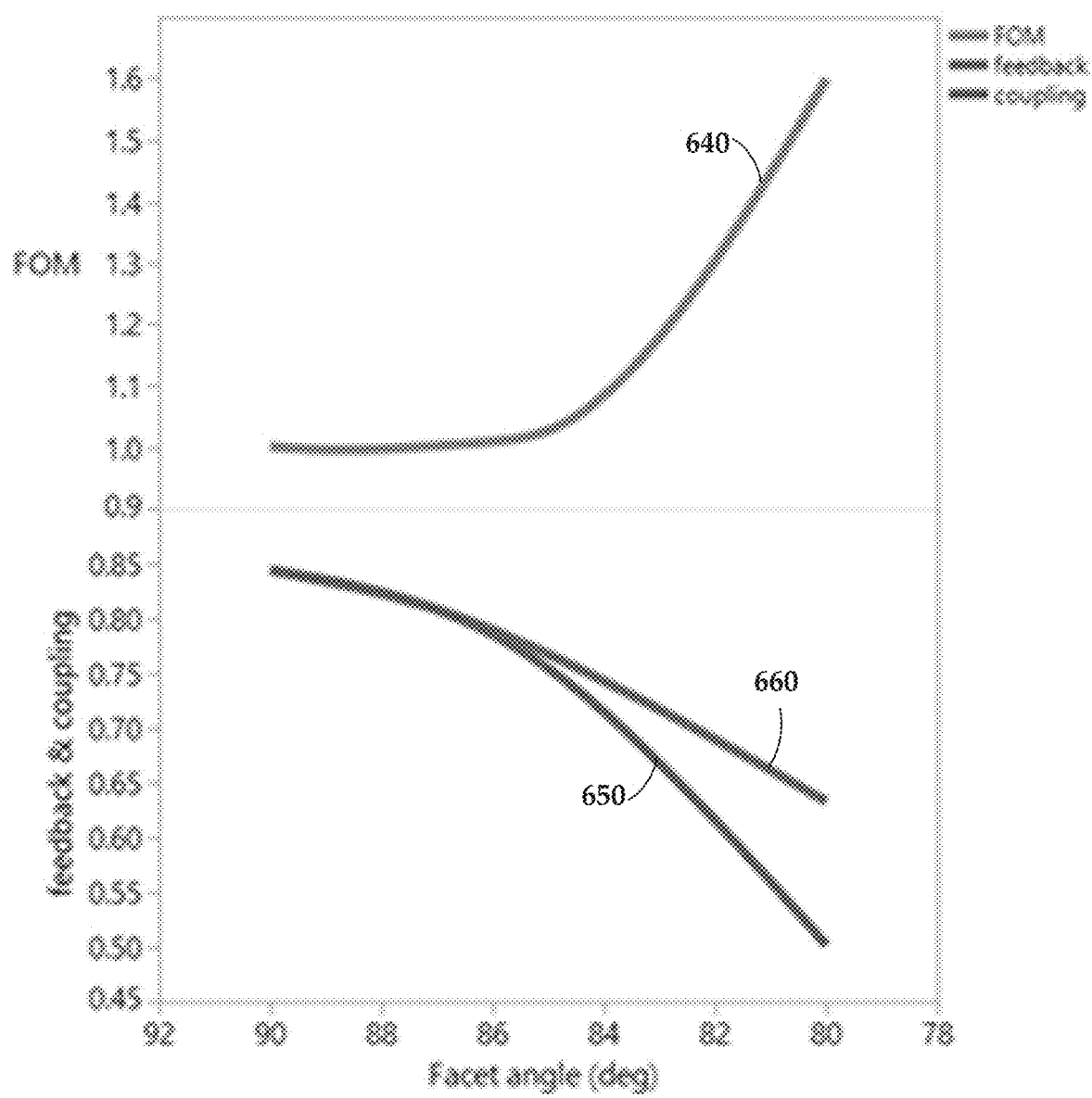
FIGS. 6D-6F show example results using an angled laser feedback suppressor with an input coupler for a vertically angled front facet in accordance with embodiments described herein.
Figure 6E:
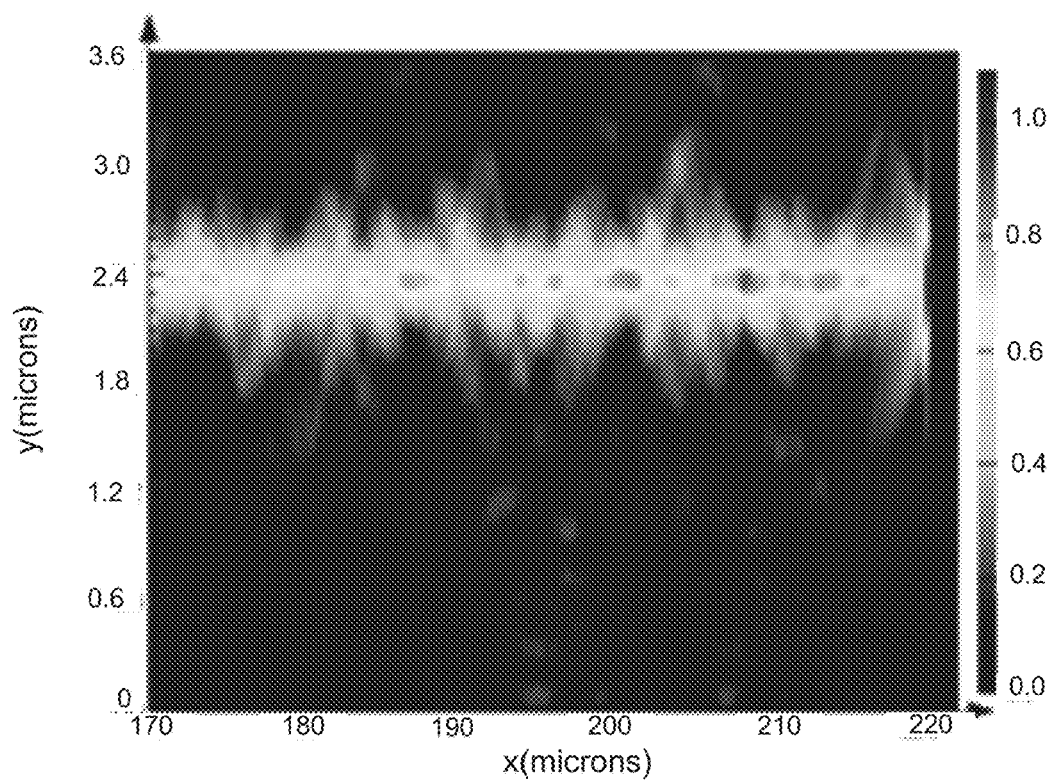
Figure 6F:
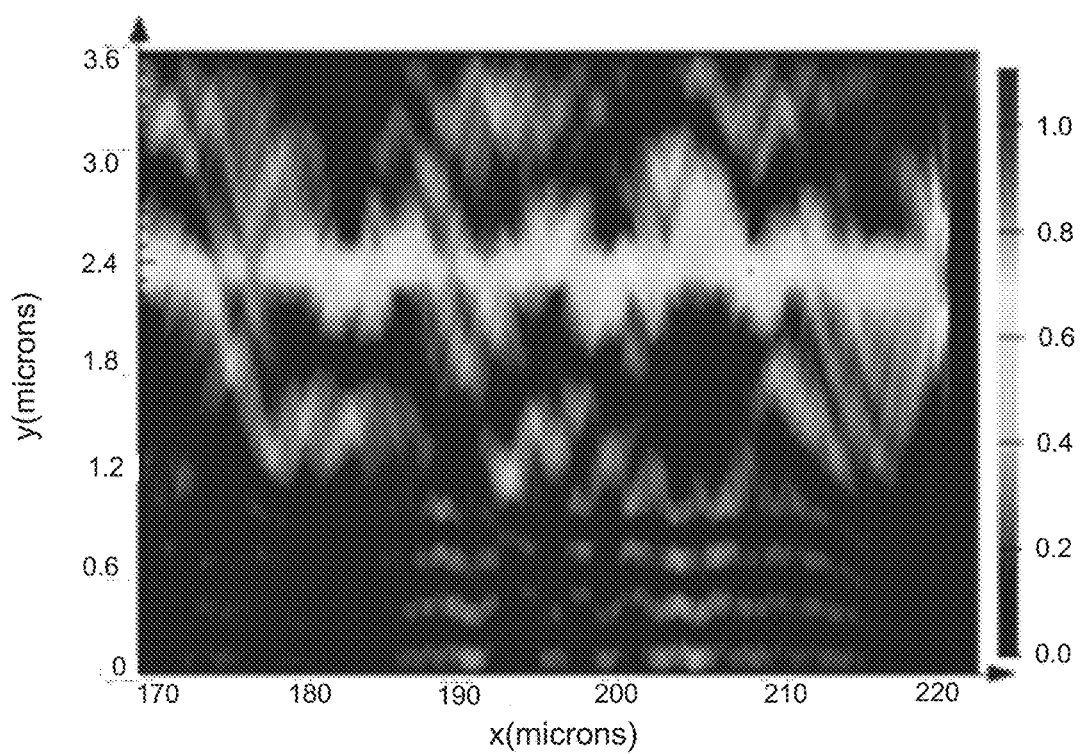

FIGS. 6A-6C show example results using an angled laser feedback suppressor with an input coupler for a laterally angled front facet. FIGS. 6D-6F show example results using an angled laser feedback suppressor with an input coupler for a vertically angled front facet. In these examples, there is a greater sensitivity to lateral angle and relatively less sensitivity to vertical angle. Line 610 of FIG. 6A shows the FOM versus the front facet angle. Lines 620 and 630 show the coupling and the feedback versus the facet angle, respectively. Here, it can be observed that suppression is maximum for a lateral angle of about 85°. FIG. 6B shows a 2D field profile where the front facet is substantially perfectly vertical, i.e., with a 90° angle. FIG. 6C illustrates a 2D field profile where the facet is at a lateral angle of about 85°.

Line 640 of FIG. 6D shows the FOM versus the front facet angle. Lines 650 and 660 show the coupling and the feedback versus the facet angle, respectively. Here, it can be observed that the feedback suppression remains unchanged to about 85°. The feedback suppression then deteriorates sharply when the angle decreases below about 85°. FIG. 6E shows a 2D field profile where the front facet is substantially perfectly vertical, i.e., with a 90° angle. FIG. 6F illustrates a 2D field profile where the facet is at a lateral angle of about 85°.

Figure 7A:
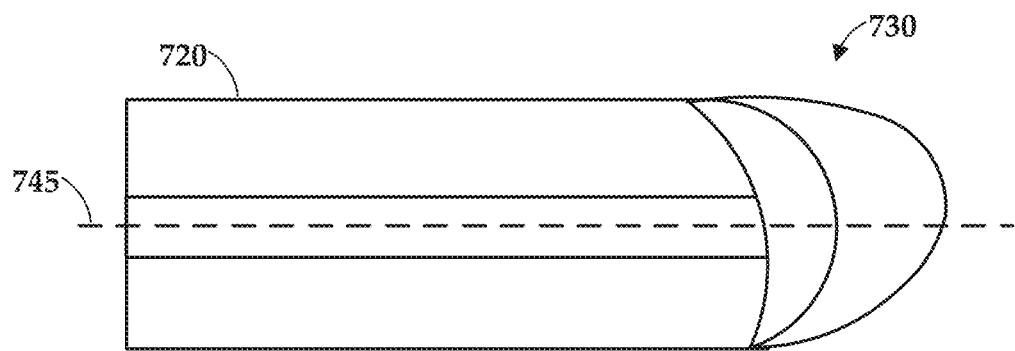
FIG. 7A shows a laser having a concave front facet in accordance with embodiments described herein.
Figure 7B:
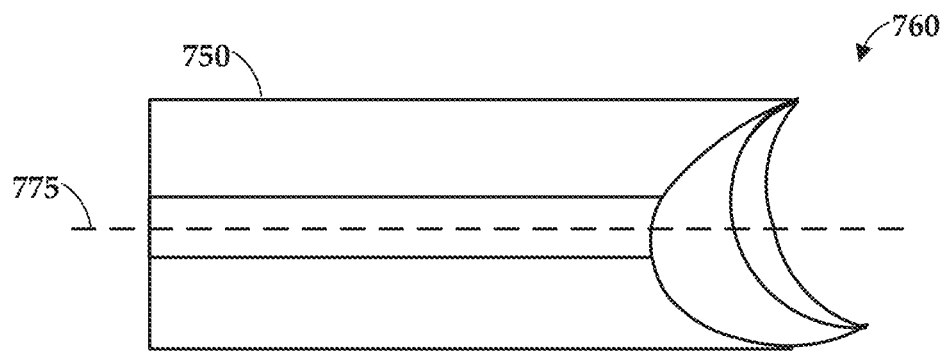
FIG. 7B shows a laser having a convex front facet in accordance with embodiments described herein.

The front facet may have a different shape that is configured to suppress feedback. FIGS. 7A and 7B show examples in which the front facet has a curved surface in accordance with embodiments described herein. FIG. 7A shows a laser 720 having a concave front facet 730. The concave front facet is off centered with respect to an axis 745 along the light propagation direction. FIG. 7B illustrates a laser 750 having a convex front facet 760. The convex front facet is off centered with respect to an axis 775 along the light propagation direction. While, FIGS. 7A and 7B show curved facets that are off centered with respect to an axis of the laser, it is to be understood that the facets may be centered. The embodiments shown in FIGS. 7A and 7B can be combined with an angled lateral and/or angled vertical facet and/or any other embodiments described herein.

Figure 8:
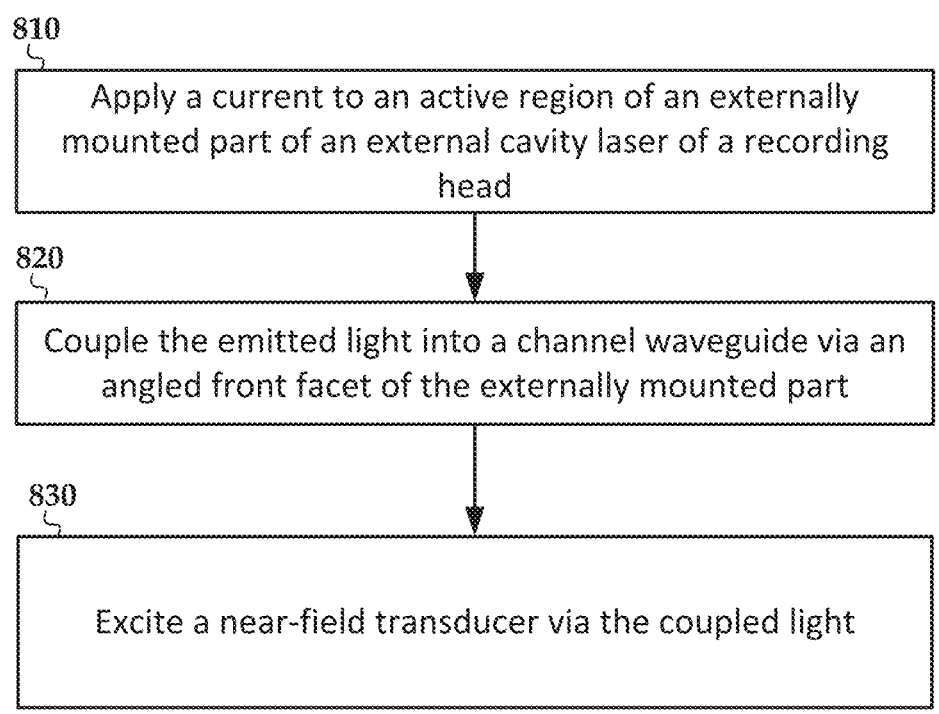
FIG. 8 shows a process for suppressing optical feedback in a HAMR system in accordance with embodiments described herein.

FIG. 8 shows a process for suppressing optical feedback in a HAMR system in accordance with embodiments described herein. A current is applied 810 to an active region of an externally mounted part of an edge-emitting laser of a recording head. The laser has an active region having a longitudinal axis corresponding to a propagation direction of a channel waveguide. The active region emitting light from an angled front facet. The angled front facet may be configured to allow forward light transmission and reduce feedback. According to various configurations, the angled front facet is configured to suppress an amount of feedback in the range of about 20% to about 30%. The emitted light is coupled 820 into the channel waveguide via the angled front facet, the channel waveguide extending towards a media-facing surface of the recording head. A near-field transducer is excited 830 via the coupled light.

According to various embodiments described herein, the surface shape of the front facet comprises one or both of a vertical angle and a lateral angle. One or both of the vertical angle and the lateral angle is greater than or equal to about 45° and less than about 90°. In some cases, one or both of the vertical angle and the lateral angle is about 85°. According to various configurations, the angled front facet comprises both a vertical angle and a lateral angle and the vertical angle is different or substantially the same as the lateral angle. According to embodiments described herein, the angled front facet comprises one or more of a convex shape and a concave shape. One or more of the convex shape and the concave shape may be off centered with respect to the longitudinal axis. According to embodiments described herein, the surface shape is configured to allow forward light transmission and reduce feedback.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
   a channel waveguide that delivers light to a media-facing surface;
   a near-field transducer (NFT) at an end of the channel waveguide and proximate to the media-facing surface; and
   a laser comprising an active region formed of a non-self supporting, crystalline layer transfer printed to a substrate, the active region having a longitudinal axis corresponding to a propagation direction of the channel waveguide, the active region comprising a back facet and a front facet proximate the NFT, the front facet having a surface shape configured to suppress back reflection of the light, the surface shape of the front facet comprising one or both of a convex shape and a concave shape.

2. The recording head of claim 1, wherein one or both of the convex shape and the concave shape is off centered with respect to the longitudinal axis.

3. The recording head of claim 1, wherein the surface shape is configured to allow forward light transmission and reduce feedback.

4. The recording head of claim 1, wherein the surface shape of the front facet is configured to suppress an amount of feedback in the range of about 20% to about 30%.

5. The recording head of claim 1, wherein:
   one or both of the convex shape and the concave shape comprises one or both of a vertical angle and a lateral angle; and
   the one or both of the vertical angle and the lateral angle is greater than or equal to about 45° and less than about 90°.

6. The recording head of claim 1, wherein:
   one or both of the convex shape and the concave shape comprises one or both of a vertical angle and a lateral angle; and
   the vertical angle is different than the lateral angle.

7. The recording head of claim 1, wherein:
   one or both of the convex shape and the concave shape comprises one or both of a vertical angle and a lateral angle; and
   the vertical angle is substantially the same as the lateral angle.

8. A recording head, comprising:
   a channel waveguide that delivers light to a media-facing surface;
   a near-field transducer (NFT) at an end of the channel waveguide and proximate to the media-facing surface; and
   a laser comprising an active region formed of a non-self supporting, crystalline layer transfer printed to a substrate, the active region having a longitudinal axis corresponding to a propagation direction of the channel waveguide, the active region comprising a back facet and a front facet proximate the NFT, the front facet having a surface shape configured to suppress back reflection of the light, the surface shape of the front facet comprising a curved shape and one or both of a convex shape and a concave shape.

9. The recording head of claim 8, wherein one or both of the convex shape and the concave shape is off centered with respect to the longitudinal axis.

10. The recording head of claim 8, wherein the surface shape is configured to allow forward light transmission and reduce feedback.

11. The recording head of claim 8, wherein the surface shape of the front facet is configured to suppress an amount of feedback in the range of about 20% to about 30%.

12. The recording head of claim 8, wherein:
    the curved shape comprises one or both of a vertical angle and a lateral angle; and
    the one or both of the vertical angle and the lateral angle is greater than or equal to about 45° and less than about 90°.

13. A recording head, comprising:
    a channel waveguide that delivers light to a media-facing surface;
    a near-field transducer (NFT) at an end of the channel waveguide and proximate to the media-facing surface; and
    a laser comprising an active region formed of a non-self supporting, crystalline layer transfer printed to a substrate, the active region having a longitudinal axis corresponding to a propagation direction of the channel waveguide, the active region comprising a back facet and a front facet proximate the NFT, the front facet having a surface shape configured to suppress back reflection of the light, the surface shape of the front facet comprising a curved shape.

14. The recording head of claim 13, wherein the curved shape is off centered with respect to the longitudinal axis.

15. The recording head of claim 13, wherein the surface shape is configured to allow forward light transmission and reduce feedback.

16. The recording head of claim 13, wherein the surface shape of the front facet is configured to suppress an amount of feedback in the range of about 20% to about 30%.

17. The recording head of claim 13, wherein:
the curved shape comprises one or both of a vertical angle and a lateral angle; and
the one or both of the vertical angle and the lateral angle is greater than or equal to about 45° and less than about 90°.

18. The recording head of claim 13, wherein:
the curved shape comprises one or both of a vertical angle and a lateral angle; and
the one or both of the vertical angle and the lateral angle is about 85°.

19. The recording head of claim 13, wherein:
the curved shape comprises one or both of a vertical angle and a lateral angle; and
the vertical angle is different than the lateral angle.

20. The recording head of claim 13, wherein:
the curved shape comprises one or both of a vertical angle and a lateral angle; and
the vertical angle is substantially the same as the lateral angle.

* * * * *